United States Patent [19]

Wydler et al.

[11] 3,916,569

[45] Nov. 4, 1975

[54] METHODS OF AND MEANS FOR PRODUCING HELICALLY TOOTHED GEARS

[75] Inventors: Robert Wydler, Zurich; Gerd R. Sommer, Dietikon, both of Switzerland

[73] Assignee: Maag Gear Wheel & Machine Company Limited, Switzerland

[22] Filed: Mar. 21, 1974

[21] Appl. No.: 453,492

[30] Foreign Application Priority Data
Mar. 26, 1973  Switzerland.......................... 4317/73

[52] U.S. Cl.............. 51/33 W; 51/52 R; 51/95 GH; 51/287
[51] Int. Cl.²......................................... B23F 9/02
[58] Field of Search......... 51/32, 33 R, 33 W, 52 R, 51/56, 95 GH, 123 G, 287; 90/8

[56] References Cited
UNITED STATES PATENTS

| | | | |
|---|---|---|---|
| 2,164,978 | 7/1939 | Wildhaber | 51/123 G |
| 3,091,059 | 5/1963 | Cleff | 51/32 |
| 3,386,213 | 6/1968 | Hauser | 51/287 |
| 3,540,157 | 11/1970 | Cleff | 51/32 X |
| 3,753,319 | 8/1973 | Mesey | 51/56 G |
| 3,763,598 | 10/1973 | Hofler | 51/52 R |

*Primary Examiner*—James L. Jones, Jr.
*Assistant Examiner*—K. J. Ramsey
*Attorney, Agent, or Firm*—Toren, McGeady and Stanger

[57] ABSTRACT

A helically toothed internal involute gear is produced by the gear generating process with cutting strokes of a grinding wheel being made substantially in the direction of the gear face width, such that an active grinding point of the tool follows a straight generating line, and generating and feed displacements between the gear and the tool being made substantially in the direction of the tooth depth. Means are provided for automatically modifying cutting strokes of the tool along paths leading into the tooth root by deflecting the tool immediately before the root surface is reached.

8 Claims, 9 Drawing Figures

METHODS OF AND MEANS FOR PRODUCING HELICALLY TOOTHED GEARS

BACKGROUND OF THE INVENTION

The invention relates to a method of and means for producing helically toothed involute gears with so-called longitudinal grinding techniques, that is to say, techniques in which the cutting or grinding strokes are made substantially along the direction of the gear wheel face width and movements in the direction of the tooth depth provide involute generating and cutting feed displacements.

Such techniques have hitherto been used in the production of large and heavy gears, with the grinding disc axis or axes inclined in the direction of the gear pressure angle and are known under the name of the 15°/20° method. With the 15°/20° method, however, internal spur gears cannot be produced, since the tool incorporates the principle of a rack and a rack cannot be brought into engagement with an internal gear.

Two other techniques have become known for the grinding of smaller gears: in these the generating motion is relied upon to provide the cutting stroke direction and they can be referred to as transverse grinding. Thus, in comparison with a relatively slow feed movement in the direction of the face width, there is a rapid reciprocatory generating motion, which can be regarded as producing a series of cutting strokes in the direction of the tooth depth. When cutting helical toothing, the workpiece is not only displaced axially, but is simultaneously rotated, so that it is screwed past the grinding wheels as a feeding movement, corresponding to the angle of the helix.

If the active areas of the rims of the grinding discs in such transverse grinding each lie in a plane which corresponds to the pressure angle of the two sides of the tooth of the generating rack, then this technique involves the so-called 15°/20° method with generation on the reference circle, with which is produced the known criss-cross surface grinding effect for external teeth.

However, if the axes of the grinding discs in such transverse grinding (using two grinding wheels) lie substantially parallel to one another, then what is involved is the so-called zero degree method with generation on the base circle. In this case, also internal teeth can be ground.

These known transverse grinding techniques are, however, not suitable for grinding large and heavy workpieces. Longitudinal grinding is better for such tasks, not only because of the relatively slow generating motion of the workpiece, but also because of the nature of the grinding itself. But as already indicated, known longitudinal grinding techniques have not been applicable to cutting or grinding internal helical teeth.

SUMMARY OF THE INVENTION

According to the present invention, there is provided a method of producing a helically toothed internal involute gear by the gear generating process employing longitudinal grinding techniques in which the cutting strokes are made substantially along the direction of the gear face width and movements substantially in the direction of the tooth depth provide generating and feed displacements, the method further comprising guiding the grinding tool along a path that causes an active grinding point of the tool to follow a straight generatrix of the involute helical tooth surface and deflecting the grinding tool, preferably outwardly from said path, immediately before the tool reaches the root surface.

It is of course to be understood that making the cutting strokes in the direction of the straight generating line embodies the main features of, and can be referred to as, longitudinal grinding, although there is a very small component of movement in the direction of the tooth depth in the orientation of the cutting strokes. Also, as is well understood in the art, although reference is made to an active grinding point, this in practice can extend to a small arcuate region.

BRIEF DESCRIPTION OF THE DRAWINGS

The invention will be more particularly described, by way of example, by reference to the accompanying drawings, wherein.

DESCRIPTION OF THE PREFERRED EMBODIMENTS

Figure 1:
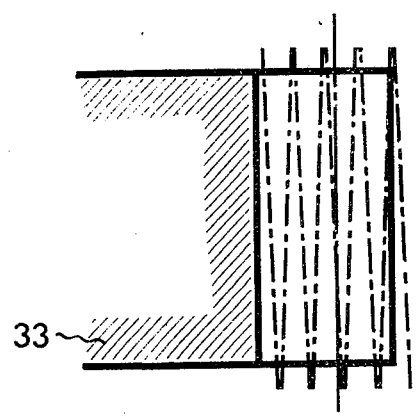
FIGS. 1 to 3 show the patterns of relative movement between a grinding tool and a gear tooth face in three different grinding methods, of which the first two are known and the last, in FIG. 3, illustrates in a somewhat exaggerated manner the method of the present invention.
Figure 2:
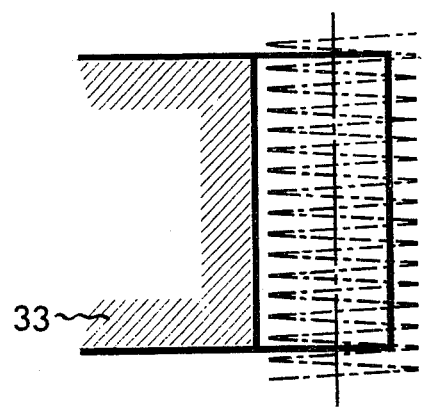
Figure 3:
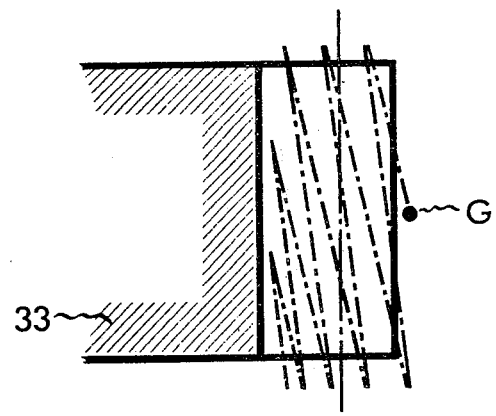

Referring to FIGS. 1 to 3 of the drawings, these show as chain-dotted lines, three different path patterns of relative movement between grinding tool and workpiece 33. FIG. 1 illustrates longitudinal grinding by the 15°/20° method referred to above and FIG. 2 illustrates the path pattern for transverse grinding techniques, whether using the 15°/20° method or the zero degree method. FIG. 3, however, illustrates the longitudinal grinding method of the present invention.

Figure 4:
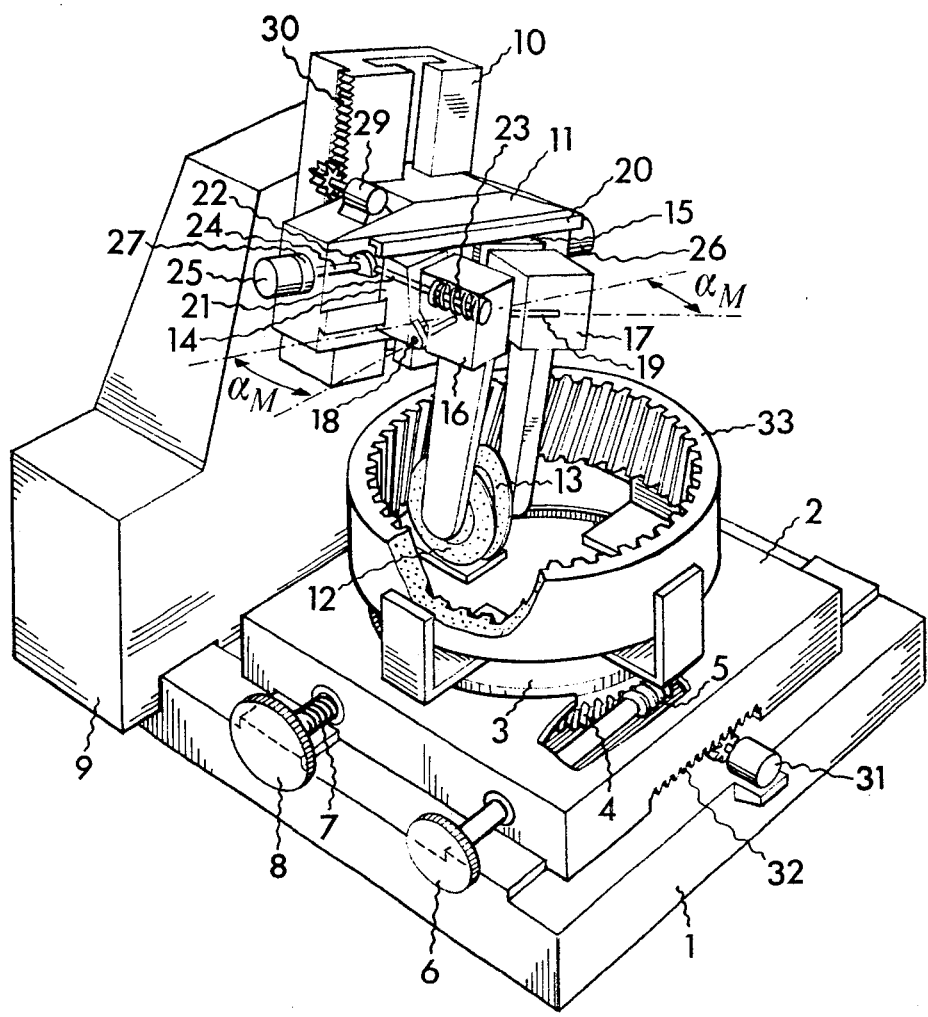
FIG. 4 is a simplified view in perspective of the machine according to the invention for grinding the tooth flanks of a gear wheel workpiece with two grinding discs.
Figure 5:
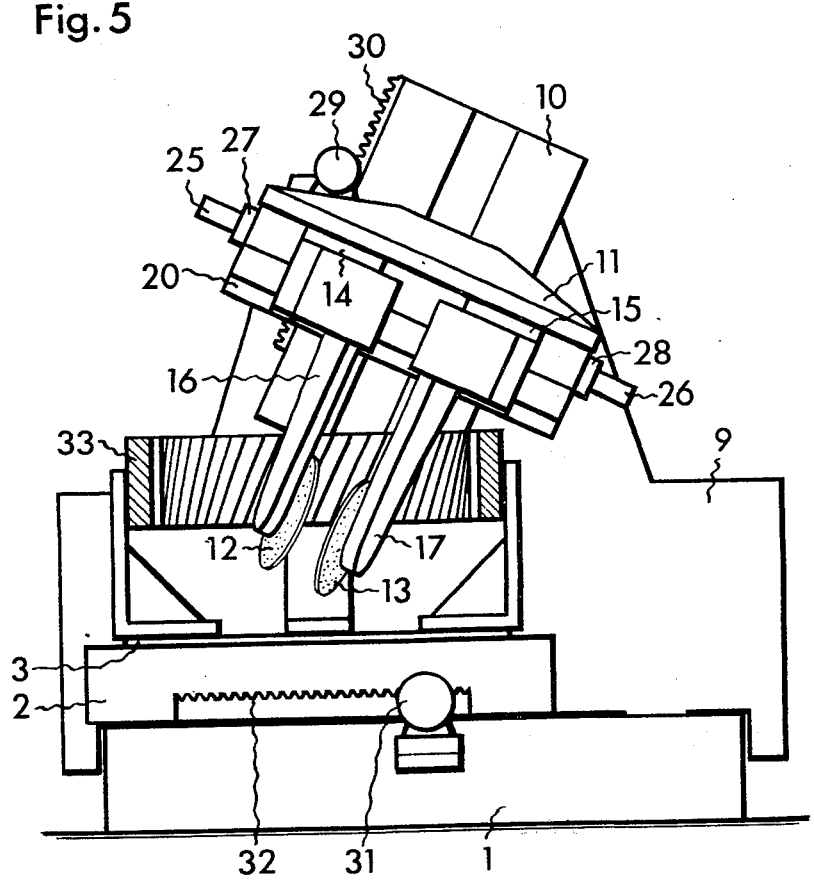
FIG. 5 shows the machine of FIG. 4 in front elevation and when grinding an internally toothed helical involute gear, here also the illustration being simplified to show only those elements of the machine essential for an understanding of the invention.

To explain the generation of this last path pattern, reference will now be made to the tooth flank grinding machine shown in FIGS. 4 and 5. Arranged for transverse displacement on a bed 1 of the machine is a generating carriage 2. Rotatably mounted on the carriage 2 is a workpiece table 3 to which is secured a worm wheel 4 meshing with a worm 5 driven from an interchangeable gear 6. The transverse displacement of the generating carriage is effected by means of a threaded spindle 7 which is driven by an interchangeable gear 8. The drive inputs to the gears 6 and 8 are entirely conventional and have therefore not been illustrated for the sake of simplicity. As is well known in the art, the interchangeability of the gears 6 and 8 and of gears in their driving trains, and the interconnection of the two drive inputs synchronises the movement of the carriage 2 and table 3 and permits different relative rates of these two movements to be selected.

Arranged on the bed 1 to be longitudinally adjustable towards and away from the carriage 2 is a support 9, on which is fixed a tool carriage guide arrangement 10. This latter is set at an inclination (FIG. 5) corresponding to the helix angle of the teeth to be ground on the workpiece. On the arrangement 10 a tool carriage 11 is upwardly and downwardly slidable for the working strokes of grinding discs 12 and 13. The discs are transversely adjustable towards and away from each other by means of adjusting slides 14 and 15 on the carriage 11. Tool holders 16 and 17 for the grinding discs are pivotally mounted on the respective slides on axes 18 and 19, which are inclined at an angle $\alpha_M$ relative to transverse adjustment plane 20 of the tool carrige 11, the angle $\alpha_M$ being approximately between 10° and 20°, e.g. 12°, so that a grinding disc when cutting the root region of a tooth does not touch the tooth tip.

Similar mechanisms are provided for deflection of each of the tool holders 16 and 17 about their respective axles 18 and 19. The mechanism for deflection of the tool holder 16 is shown in detail and comprises a rod 21 which is displaced by a cam disc 22, the rod 21 being urged by a spring 23 against the cam disc 22 and the cam disc being fixed on and rotated by a shaft 24. An analogous mechanism arranged symmetrically to that for the holder 16 is provided for the holder 17. On the respective cam shafts of these mechanisms are arranged stepping motors 25, 26 and also servomotors 27, 28 for amplification of the stepping motor outputs.

In order to establish the stroke position, a position indicator 29 is fixed on the tool carriage 11, the indicator meshing with a rack 30 on the guide arrangement 10. Another position indicator 31 is mounted on the bed 1; this meshes with a rack 32 on the generating carriage 2 and indicates the relative transverse position of the generating carriage.

Figure 6:
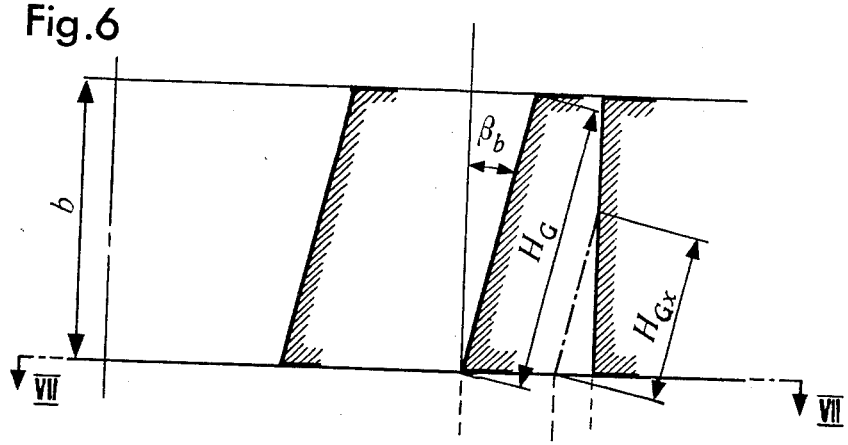
FIG. 6 is a schematic view of the workpiece as from the section line VI—VI of FIG. 7 and in three different positions in the generating movement — the tooth depth has been somewhat exaggerated so as to increase the spacing of the illustrated generating positions for the purpose of clarity.
Figure 7:
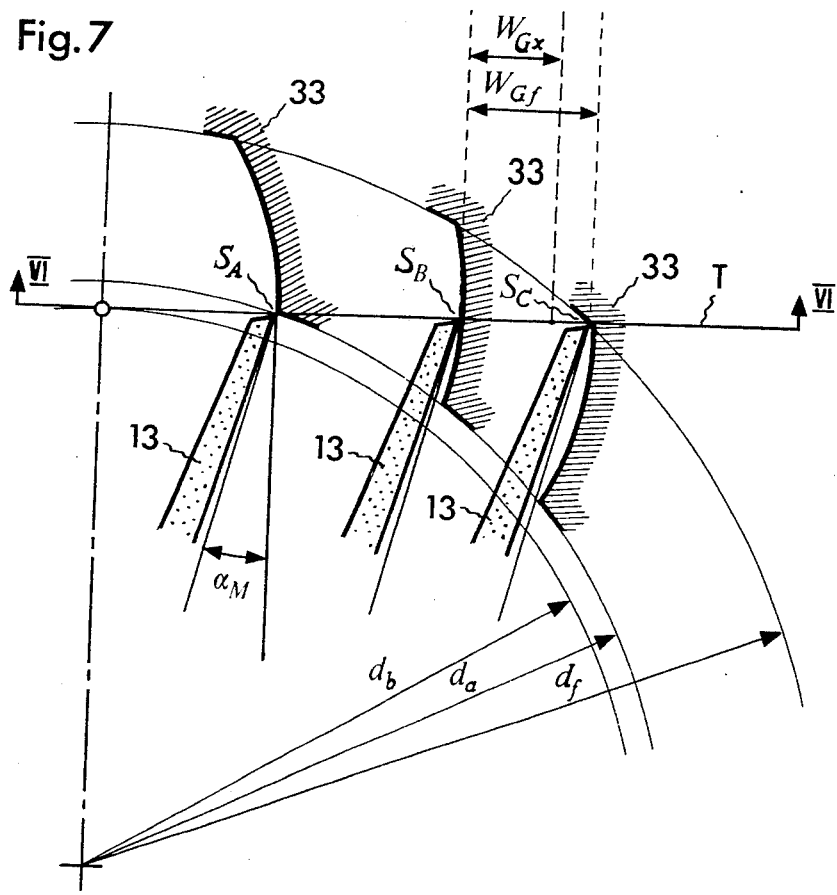
FIG. 7 illustrates schematically the positions of one of the grinding discs of the machine of FIGS. 4 and 5 when grinding the right-hand profile in the three different generating positions of FIG. 6, the view being shown from the line VII—VII in FIG. 6.

The workpiece 33 which is to be machined, clamped on the workpiece table 3, rolls on a base circle with the diameter $d_b$ (FIG. 7), by the workpiece table 3 being rotated and simultaneously the generating carriage 2 being displaced transversely in accordance with the synchronised motions of the drive gears 6 and 8 and the selected relative rates of rotation of these gears, in the known manner. With commencement of the grinding at the tooth tip at the diameter $d_a$, the tool contact position $S_A$ is obtained and as the generating movement progresses, the intermediate position $S_B$ is reached while at the end of the generating movement at the diameter $d_f$, the grinding disc 13 comes approximately to the root of the tooth at the position $S_C$, where, as FIG. 6 shows, the line of intersection of the tooth face with the section plane runs axially in contrast to the inclination at the helix angle $\beta_b$ of the corresponding lines for the positions $S_A$ and $S_B$.

The active grinding point S of the grinding disc 13 thus travels during the generating movement on a tangent T (identical with the line of action) to the base circle with the diameter $d_b$. This corresponds to the so-called zero degree generating method, since in the basic method (as described for example in the MAAG Gear Book, 1963) the axes of the grinding discs enclosed an angle of 0° relatively to one another. In the present case, the grinding disc axes are now at the angle $\alpha_M$ to the transverse adjustment plane 20.

In accordance with the general geometry for involute gear teeth, the straight generatrix E of a helical tooth form is disposed somewhat obliquely in relation to the tooth flank (FIG. 8) and is a tangent to the base cylinder. With the generating motion imagined as being stopped, the active grinding point S, during a stroke movement H of the tool carriage 11, runs exactly along the generatrix E. If the generating motion operates continuously, then the active grinding point S passes through the series of arrowed lines 34 and thus travels only approximately in the direction of the generatrix E, but sufficiently closely for the process to be regarded as longitudinal grinding.

If now the grinding disc 13, during the grinding of the right-hand flank 35, comes close to the surface of the root 36 of the tooth, e.g. at the point 37, then displacement of the grinding disc holder 17 about the axis 19 takes place through a mechanism comprising a cam disc and a rod analogous to the cam disc 22 and the rod 21, to deflect the disc 13 and move the active grinding point out of grinding engagement to the point 38. The analogous mechanism through which the stepping motor 26 and the servomotor 28 operate to displace the holder 17 is similar and symmetrical to the mechanism comprised of cam disc 22 and rod 21 which operates to displace holder 16. The remaining upward stroke movement to the upper reversal point is then completed with the grinding wheel out of engagement with the workpiece, and with the wheel still out of engagement, is followed by a downward stroke movement to the point 39 where there begins an inwards (i.e. towards the tooth root) displacement of the active grinding point by the cam mechanism to a point 40 into an operating position, and from this position onwards the downward stroke to the bottom reversal point of the stroke H is completed. The next upward stroke movement is then taken to the point 41, before there is once again an outwards deflection, to the point 42, and a following completion of the upward stroke movement to the upper reversal point. Similarly, the next downward stroke movement runs to the point 43 before inward deflection to the point 44 and completion of the stroke to the reversal point 45. At this stage, the flank 35 is fully ground (it will be appreciated that an arbitrary number of cutting strokes has been described for illustration of the process) and the position of the workpiece corresponds to the generating position $S_C$ (FIG. 7) whereupon the grinding discs 12 and 13 are raised above the upper reversal point of the stroke H and the workpiece 33 is rotated by one tooth pitch. The cycle of operations is then repeated for the grinding of the next tooth flank or (with the two grinding discs shown in FIGS. 4 and 5) the next pair of flanks.

Figure 8:
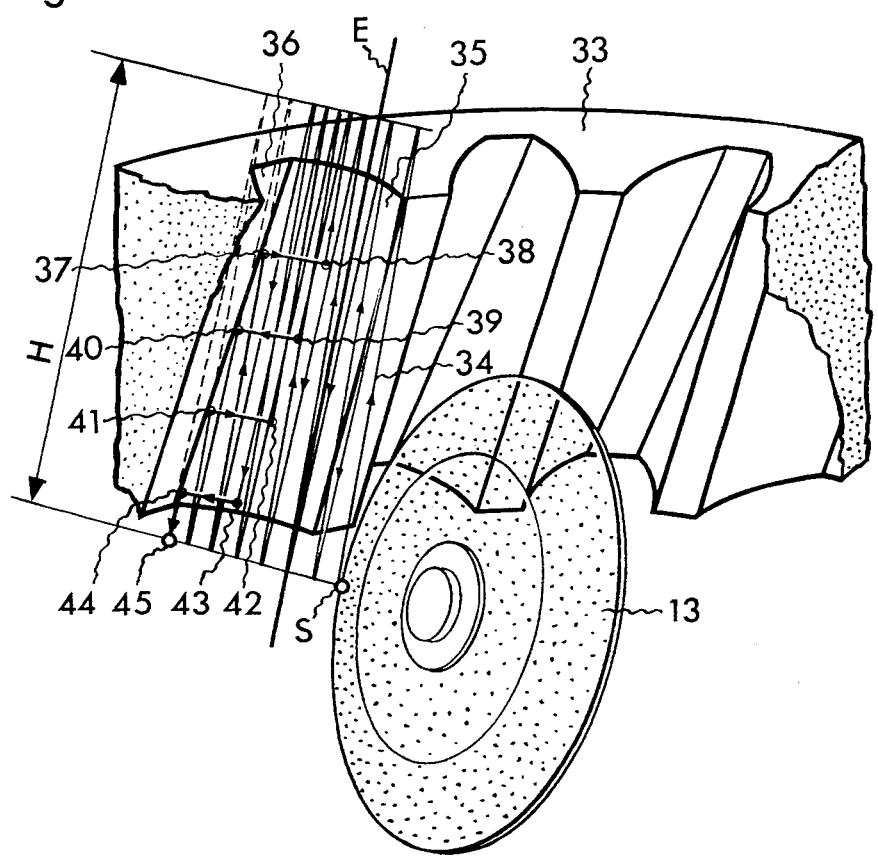
FIG. 8 shows a portion of an internal helical gear in perspective, together with a grinding disc, when machining the right tooth flank by means of the machine in FIGS. 4 and 5.

The grinding of the left-hand tooth flanks is in fact effected simultaneously by the grinding disc 12 — in the reverse direction to that described with reference to FIG. 8 — with most favourable conditions as regards tooth number and tooth depth: starting close to the tooth root and ending at the tooth tip for one grinding disc and vice versa for the other grinding disc at the same time. In this case, the active grinding points S of the two grinding discs 12 and 13 lie on the same tangent T to the base cylinder with the diameter $d_b$, that is, on the line of action. Corresponding to general involute gear geometry, the spacing of the two grinding points on this tangent is the so-called base tangent length which is also used in the measurement of the base tangent length.

Serving to record the outward deflection points 37/38 and 41/42 and the inward deflection points 39/40 and 43/44, are the position indicator 29 for the stroke positions and the position indicator 31 for the generating positions. Serving for the initiation of the outward and inward deflections are the two stepping motors 25 and 26, which actuate the two servomotors 27 and 28 to transmit the movements through the cam disc mechanisms to the tool holders 16 and 17.

Figure 9:
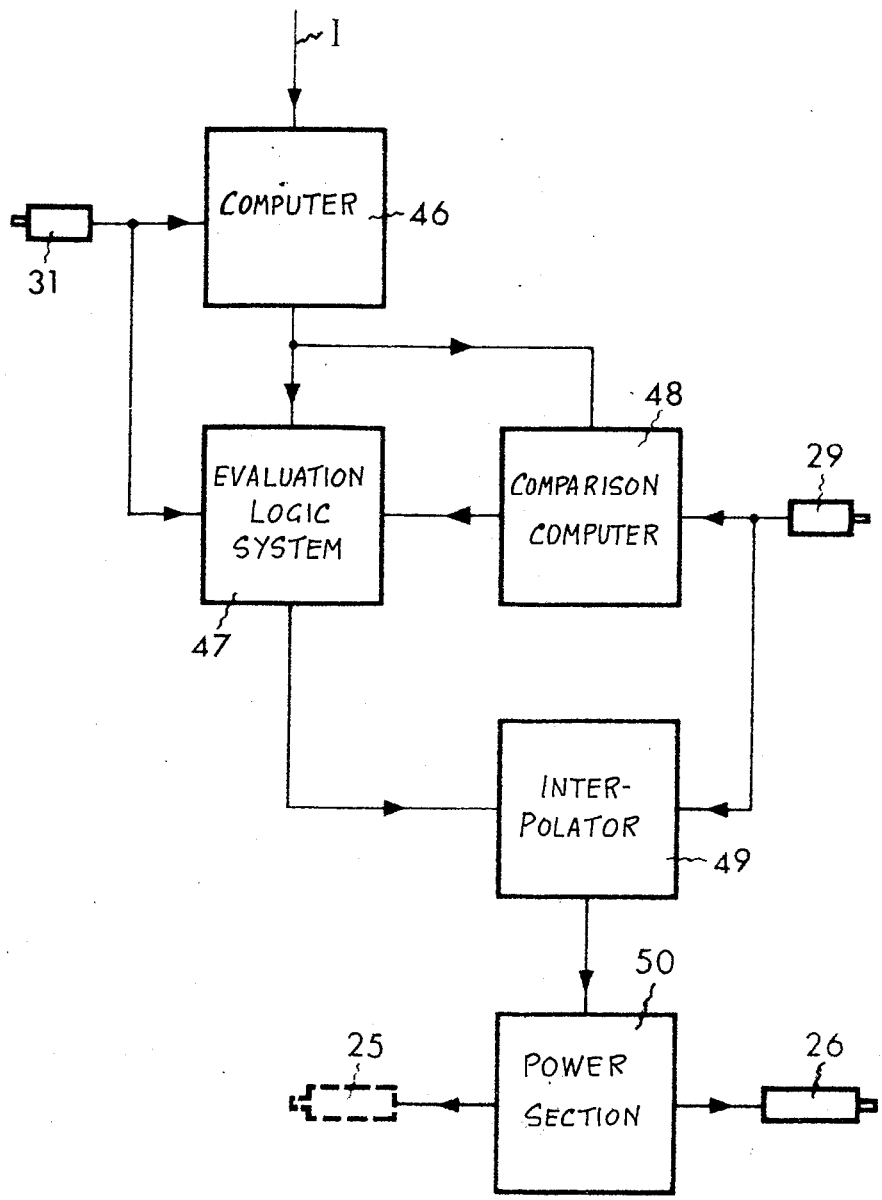
FIG. 9 shows the block circuit diagram of the electrical and electronic control means for the cutting strokes of the machine of FIGS. 4 and 5.

For the input I (FIG. 9) into a suitable computer 46, which is connected together with the position indicator 31 to an evaluation logic system 47, the following values are required:
the tooth width $b$
the base helix angle $\beta_b$
the theoretical stroke $H_G$ (FIG. 6) which, together with the overrunning of the grinding disc, provides the actual stroke H,
the base diameter $d_b$
the tip diameter $da$
the root diameter $d_f$.

For example, on starting from the middle position of the gear wheel 33 which is to be ground, in which position assuming a specific transverse section (FIG. 7) the toothing of the workpiece lies symmetrically in relation to the two grinding discs 12 and 13, then the residual generating movement as far as the root diameter corresponds to the distance $W_{Gf}$. For a certain intermediate distance of value $W_{Gx}$, the theoretical stroke defined by the outward deflection at the root cylinder with the diameter $d_f$ amounts to $H_{Gx}$ (FIG. 6). This limited stroke is calculated continuously by the computer from the relationship $$H_{Gx} = \frac{W_{Gf} - W_{Gx}}{\sin \beta_b}$$

Consequently, it is the base helix angle $\beta_b$ which appears as the most important variable for the input I into the computer.

As the generating movement progresses, the value $H_{Gx}$ which is obtained is progressively lowered or raised proportionally to said movement (depending on the generating movement direction and on whether right-hand or left-hand helical toothing is involved). The specific generating positions are established by the positions indicator 31.

In the comparision computer 48, the value $H_{Gx}$ determined by the computer 46 for one of the flanks is constantly compared with the stroke position derived from the position indicator 29 and, after evaluation in evaluation logic system 47 (which for its part corrects the rate of outwards deflection with respect to the rate of the generating motion) is advanced as an order for outward or inward deflection through interpolator 49 to a power section 50. This drives the stepping motor 26 and thus causes the outward deflection of the grinding disc or of the active grinding point S in the zone of the tooth root. This deflection represents the premature outward deflection of the direction of movement of the grinding point. The same logic units are employed for the flank being ground by the second disc, and in this case the stepping motor 25 shown in broken lines in FIG. 9 actuates the deflections.

By analogous control of the deflection mechanism, it is also possible, instead of deflecting the grinding point towards the tooth tip, to give it a deflected motion substantially parallel to the root surface, as far as the end face of the workpiece, or to reverse the movement. It is also advantageous to effectively limit the stroke when the active grinding point passes the tip cylinder to lose contact with the workpiece, for example as indicated at the point G in FIG. 3, in order thereby to reduce idle travel times.

What we claim and desire to secure by Letters Patent is:

1. A method for producing a helically toothed internal involute gear by the generating process employing longitudinal grinding techniques comprising the steps of effecting relative movement between a grinding tool and said gear substantially in the direction of the tooth depth for generating and feed displacements, effecting grinding strokes with said tool substantially along the direction of the gear face width by guiding said tool along a path that causes an active grinding point of said tool to follow a straight generatrix of the involute helical tooth surface, and deflecting said tool from said path in a predetermined manner immediately before the tool reaches the tooth root surface.

2. A method according to claim 1 wherein said deflection of said tool is obtained by displacing said tool outwardly of said straight generatrix path.

3. A method according to claim 1 wherein a pair of grinding tools are employed to simultaneously grind opposite flanks of a pair of spaced teeth of said gear, said pair of grinding tools being employed to effect simultaneous grinding strokes with the individual ones of said tools being deflected independently of each other as each approaches the root surfaces of a tooth being ground by said respective tool.

4. Apparatus for producing a helically toothed internal involute gear by the generating process employing longitudinal grinding techniques comprising a grinding tool, a slide carrying said tool, a support for said gear locating said gear relative to said slide, means for displacing the tool on said slide to perform cutting strokes on said gear substantially in the direction of the gear face width, relative movement means between said slide and said gear support for providing generating and feed displacements of said gear relative to said tool, said tool being thereby guided along a path causing an active grinding point of said tool to follow a straight generatrix of the involute helical tooth surface, and control means operable on said relative movement means to deflect said tool from said path in a predetermined manner immediately before said tool reaches the tooth root surface.

5. Apparatus according to claim 4 wherein said control means are arranged to cause deflection of said tool outwardly of said straight generatrix path.

6. Apparatus according to claim 4 comprising pivot means between the tool and the slide for performing said deflection of the tool by a rotary movement of the tool on the slide, said pivot means having an axis oriented obliquely to the direction of the translational component of the generating displacements.

7. Apparatus according to claim 4 further comprising position indicating means responsive to the cutting stroke movements and to the generating displacements, and means for receiving response signals to said movements and displacements from the indicating means for actuating said deflection of the tool in dependence thereto.

8. Apparatus according to claim 4 comprising two grinding tools for grinding simultaneously opposite flanks of two spaced teeth of the gear, said slide carrying both said tools for making cutting strokes with both tools together, said control means being operable for deflection of the respective tools independently of each other as each approaches the root surface of the tooth being cut by the tool.

* * * * *